(12) United States Patent
Shin et al.

(10) Patent No.: US 7,685,308 B2
(45) Date of Patent: Mar. 23, 2010

(54) METHOD FOR TRANSMITTING DATA BY USING X-CAST MODE

(75) Inventors: Myung Ki Shin, Daejeon (KR); Yong Jin Kim, Daejeon (KR)

(73) Assignee: Electronics and Telecommunications Research Institute (KR)

(*) Notice: Subject to any disclaimer, the term of this patent is extended or adjusted under 35 U.S.C. 154(b) by 767 days.

(21) Appl. No.: 10/488,277

(22) PCT Filed: Jan. 31, 2002

(86) PCT No.: PCT/KR02/00143

§ 371 (c)(1),
(2), (4) Date: Jul. 19, 2004

(87) PCT Pub. No.: WO03/019866

PCT Pub. Date: Mar. 6, 2003

(65) Prior Publication Data

US 2004/0243741 A1  Dec. 2, 2004

(30) Foreign Application Priority Data

Aug. 29, 2001 (KR) ............................ 2001-0052536

(51) Int. Cl.
*G06F 15/173* (2006.01)
(52) U.S. Cl. .................. 709/238; 709/204; 709/205; 709/227; 709/239; 709/242; 370/392; 370/393; 370/328; 455/428; 455/445

(58) Field of Classification Search .................. 709/204, 709/205, 227, 238, 239, 242; 370/392, 393, 370/320, 328; 455/428, 445; 710/33
See application file for complete search history.

(56) References Cited

U.S. PATENT DOCUMENTS

| | | | |
|---|---|---|---|
| 6,625,773 B1 * | 9/2003 | Boivie et al. ................. | 714/749 |
| 6,778,531 B1 * | 8/2004 | Kodialam et al. ........... | 370/390 |
| 6,954,790 B2 * | 10/2005 | Forslow ....................... | 709/227 |
| 7,016,351 B1 * | 3/2006 | Farinacci et al. ............ | 370/392 |

FOREIGN PATENT DOCUMENTS

| | | |
|---|---|---|
| JP | 2000-261429 | 9/2000 |
| JP | 2001-007835 | 1/2001 |

* cited by examiner

*Primary Examiner*—Nathan Flynn
*Assistant Examiner*—Mohammad A Siddiqi
(74) *Attorney, Agent, or Firm*—Blakely, Sokoloff, Taylor & Zafman

(57) ABSTRACT

There is provided a method for transmitting data to a multicast group including a plurality of receivers by using an X-cast mode, comprising the steps of transmitting an X-cast IP data packet having a X-cast header including addresses of a destination router and the multicast group, wherein the destination router is connected to the receivers, converting the X-cast IP data packet to a multicast IP data packet in the destination router and sending the multicast IP data packet to the receivers, wherein an IP header of the multicast IP data has the address of the multicast group. The source router can transmit an IP data packet to a multicast group having a medium or large number of receivers by using the X-cast mode.

5 Claims, 5 Drawing Sheets

| MULTICAST GROUP ADDRESS | DESTINATION ROUTER ADDRESS |
|---|---|
| G1 | 103, 105 |
| G2 | 103, 105 |
|  |  |

METHOD FOR TRANSMITTING DATA BY USING X-CAST MODE

The present patent application is a non-provisional application of International Application No. PCT/KR02/00143, filed Jan. 31, 2002.

FIELD OF THE INVENTION

The present invention relates to a method for transmitting data using an X-cast (Explicit Multicast) protocol; and, more particularly, to a method for transmitting a multicast IF data packet to a multicast group including a plurality of receivers by using the X-cast protocol.

Further, the present invention relates to a method for providing addresses of a destination router and a multicast group including a plurality of receivers to a source router, wherein the receivers are expected to receive multicast IP data packets transmitted according to the X-cast protocol.

BACKGROUND OF THE INVENTION

In an IP (Internet Protocol) network, two modes are conventionally used for the transmission of data; one is a unicast mode and the other is a multicast method. In the unicast mode, an address of an expected data receiver is specified in a header of an IP data packet to be transmitted, and routers in the network transmit the IP data packet to the specified address. In the multicast mode, on the other hand, a group address for a number of expected data receivers are identified in a header of an IP data packet, so that the routers in the network make copies of the IP data packet and transmit the copied data to the number of receivers, simultaneously. Thus, the unicast mode is used for a one-to-one transmission of data while the multicast mode is used for a one-to-many transmission of data.

The multicast mode is widely used to provide information to be shared by a plurality of receivers, e.g., information on a movie. However, in the multicast mode, an overload situation is frequently caused since the routers in the network perform a multicast routing to the number of receivers or other routers by copying the IP data. Further, while the multicast mode is highly efficient for the transmission of the same data to a number of receivers, it is inefficient in case that the number of receivers is expected to be only a few, e.g., in cases such as a multi-user telephonic communication in the Internet Telephony, a network game, a multi-user audio-video conference.

An X-cast technique is developed for solving a problem of inefficiency of multicast technique when used for a multicast group having a few receivers. In the X-cast mode, a source (or a sender) provides an X-cast packet. The X-cast packet includes an X-cast header located between an IP header and a TCP (Transmission Control Protocol) header. The IP header has information indicating the X-cast mode and the X-cast header has addresses of receivers. By using the addresses in the X-cast header, the routers in the network decide paths or next routers through which the X-cast packet is transmitted to the receivers.

In the X-cast mode, a destination router (a router connected to receivers designated by addresses in the X-past header) routes an IP data packet to the receivers by using the unicast mode. As described above, routers in the X-cast mode does not multicast IP data packets so that the load of the routers is decreased. Further, in the X-cast mode, data transmission to a group of a few receivers can be performed in efficient manner.

However, in the X-cast mode, a source must know the addresses of receivers to send a data packet in advance of transmitting the data packet. Further, the X-cast mode is suitable only for transmitting a data packet to a multicast group having a few receivers since the length of an X-cast packet header is proportional to the number of the receivers belonging to the multicast group.

SUMMARY OF THE INVENTION

It is, therefore, an object of the present invention to provide a method for transmitting an IP data packet to a multicast group having a medium or large number of receivers by using an X-cast mode.

It is another object of the present invention to provide a method for providing addresses of destination routers connected to receivers to a source router connected to a sender so that the source router can transmit an IP data packet to a multicast group having the receivers by using an X-cast mode.

In accordance with a preferred embodiment of the present invention, there is provided a method for is transmitting data to a multicast group including a plurality of receivers by using an X-cast mode, the method comprising the steps of: transmitting an X-cast IP data packet having an X-cast header including addresses of a destination router and the multicast group to the destination router, wherein the destination router is connected to the receivers; and converting the X-cast IP data packet into a multicast IP data packet having an IP header including the address of the multicast group and transmitting the multicast IP data packet to the receivers.

In accordance with another preferred embodiment of the present invention, there is provided a method for transmitting addresses of a destination router and a multicast group including a plurality of receivers connected to the destination router to a source router by using an X-cast mode, the method comprising the steps of: transmitting a multicast IP data packet having an IP header including the multicast group from the receivers to the destination router by using a multicast group join mode; and transmitting an IP data packet including the addresses of the multicast group and the destination router from the destination router to the course router by using a unicast mode.

BRIEF DESCRIPTION OF THE INVENTION

The above and other objects and features of the present invention will become apparent from the following description or preferred embodiments given in conjunction with the accompanying drawings, in which.

Figure 2:
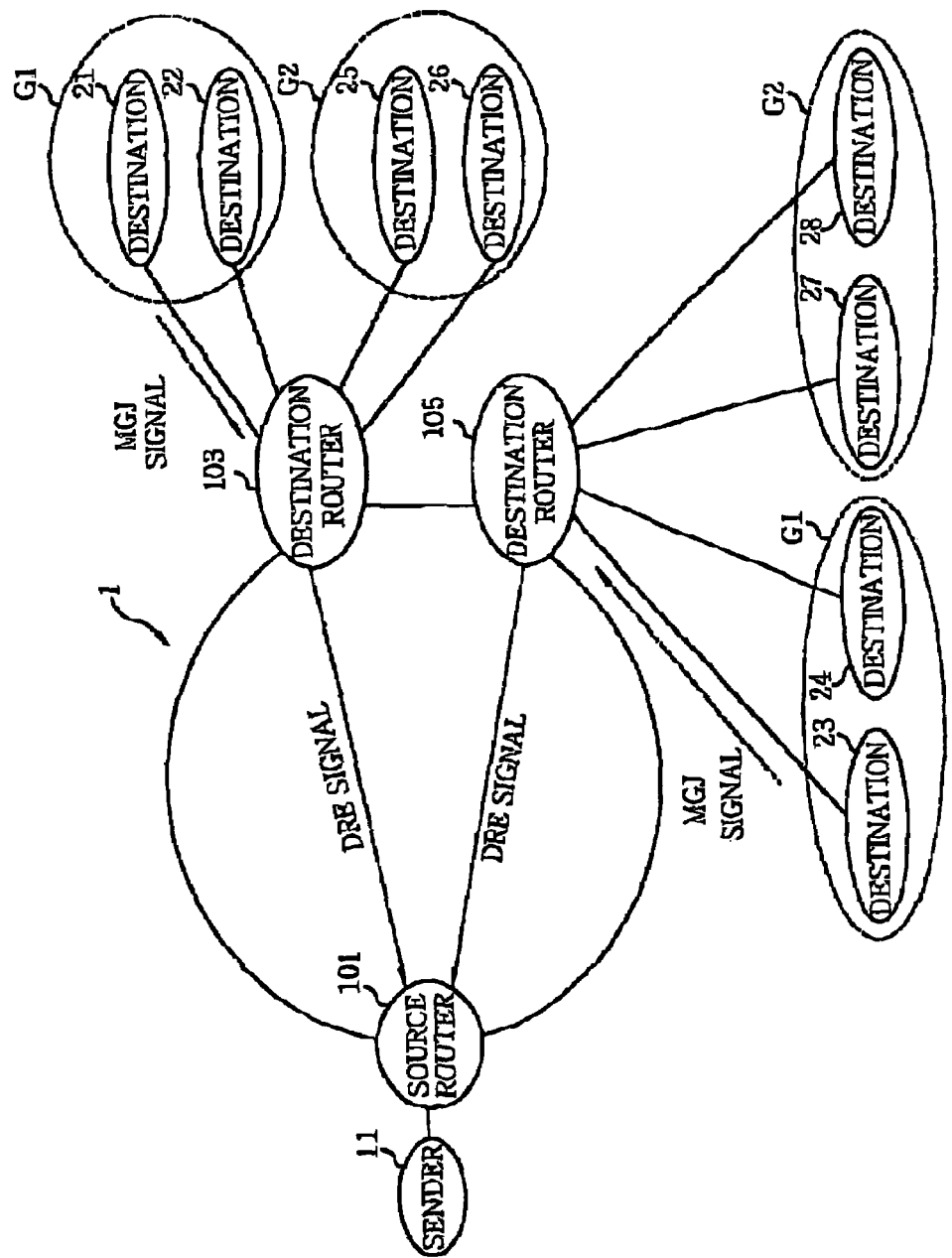
FIG. 2 shows an example of a destination router registration process which is performed according to an X-cast mode in accordance with the present invention.
Figures 3, 4:
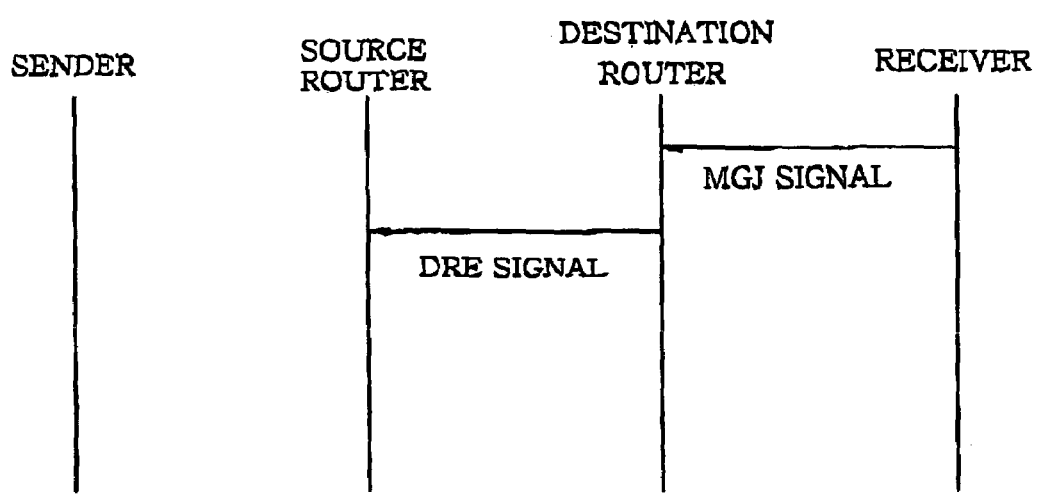
Figure 5:
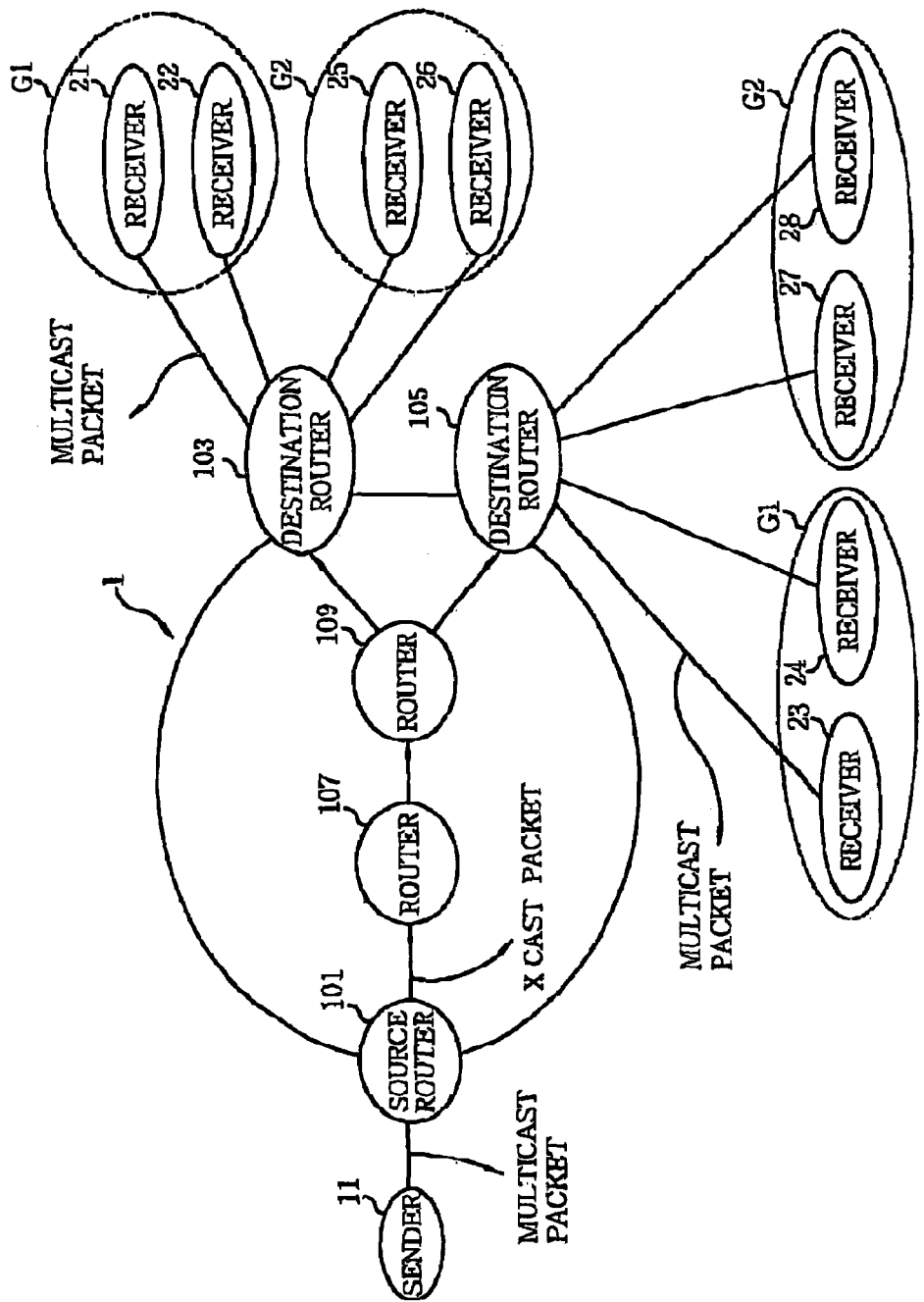
Figure 6:
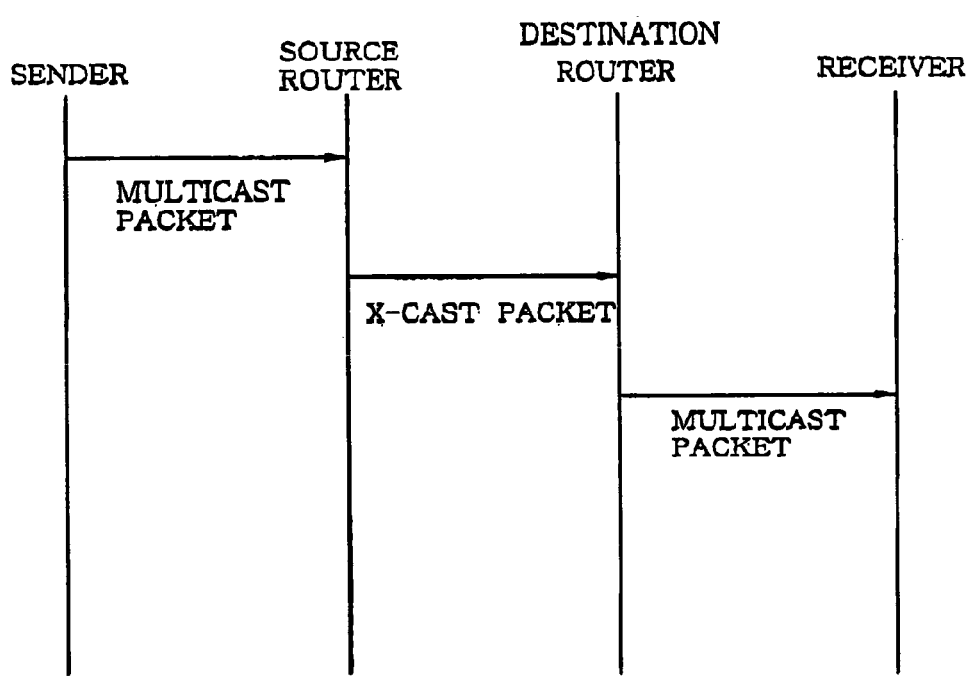
Figure 7:
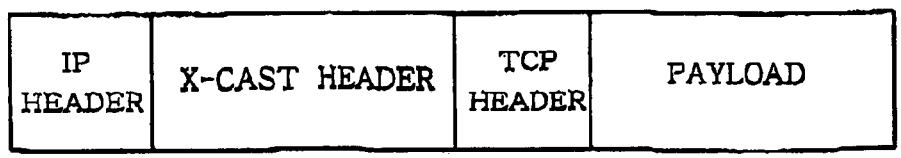

FIG. 3 exhibits a sequence of events occurred in the destination router registration process shown in FIG. 2;

FIG. 4 charts an example of information stored in a memory of the destination router during the destination router registration process shown in FIG. 2 and FIG. 3;

FIG. 5 shows a process of transmitting multicast data in accordance with a method for transmitting multicast data by using an X-cast mode in accordance with the present invention;

FIG. 6 illustrates a sequence of events occurred in the process shown in FIG. 5; and FIG. 7 exhibits a structure of an X-cast IP data packet transmitted by the source router in the process shown in FIG. 5 and FIG. 6.

DESCRIPTION OF SPECIFIC EMBODIMENTS

Figure 1:
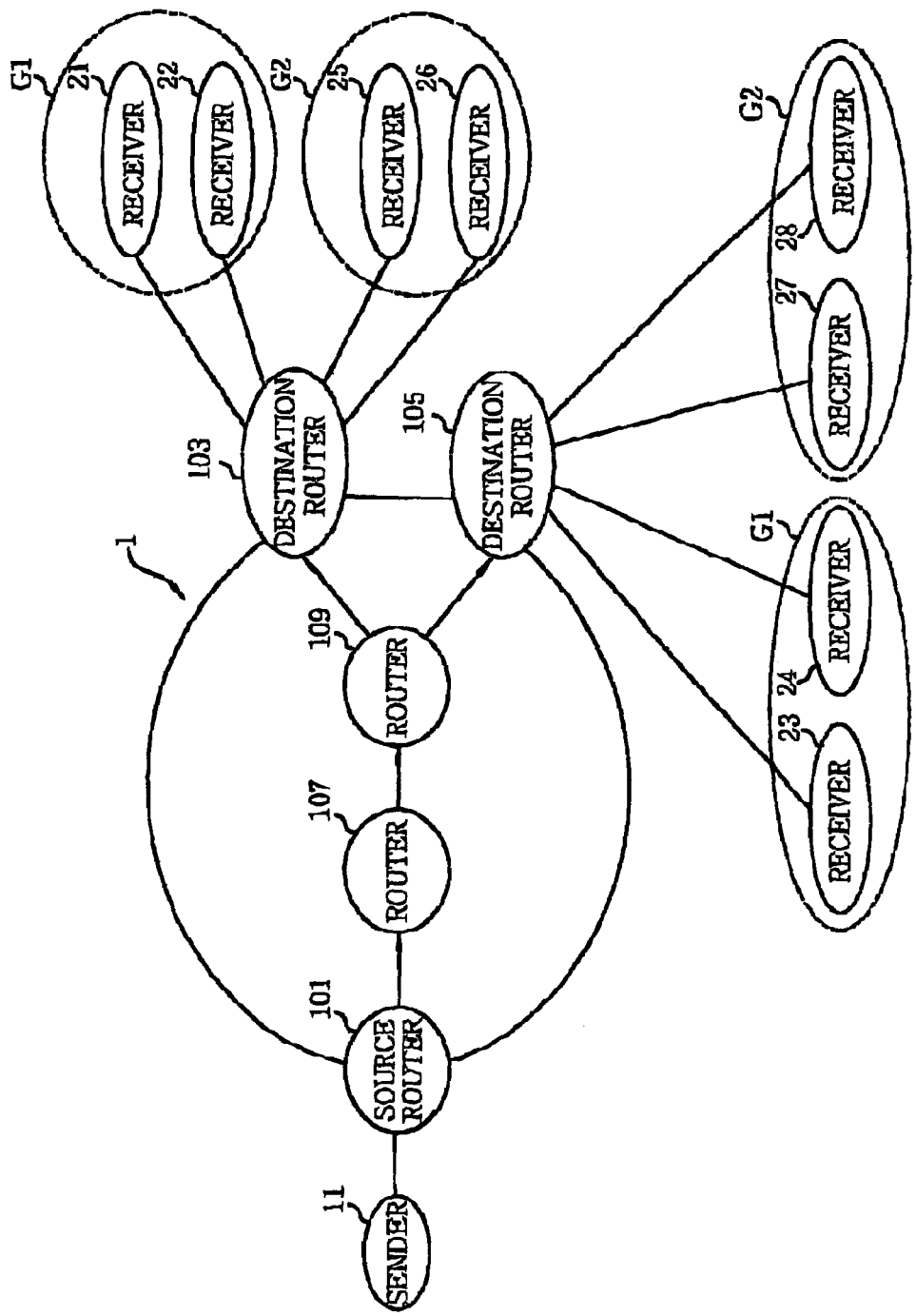
FIG. 1 illustrates an example of a network where data transmission is performed according to an X-cast mode in accordance with the present invention.

Referring to FIG. 1, there is illustrated a network 1 where a multicast data transmission is performed according to an X-cast mode in accordance with the present invention.

As shown in FIG. 1, a sender 11 represents a source for transmitting an IP data packet and receivers 21 to 28 represent destinations for receiving the IP data packet. However, it will be apparent to those skilled in the art that the receivers 21 to 28 can be a sender for transmitting an IP data packet.

The sender 11 and the receivers 21 to 28 are connected to a router 101 and routers 103 and 105, respectively. In this preferred embodiment, the router 101 directly connected to the sender 11 will be referred to as a source router while the routers 103 and 105 directly connected to the receivers 21 to 28 will be referred to as destination routers.

The receivers 21 to 28 coupled to the destination routers 103 and 105 can form two different multicast groups G1 and G2. The term "multicast group" herein used refers to a group of receivers who are expected to receive an IP data packet transmitted by the sender 11. For example, the multicast group G1 represents a group of the receivers 21, 22, 23 and 24 who are expected to receive information on a movie B from the sender 11 while the multicast group G2 represents a group of the receivers 25, 26, 27 and 28 who are expected to receive information on a movie B from the sender 11. A distinctive multicast group address is allocated to each of the multicast groups G1 and G2, and the allocated addresses are stored in the source router 101 and the destination routers 103 and 105.

There is a plurality of routers 107 to 109 between the source router 101 and the destination routers 103 and 105. It will be understood by those skilled in the art that the sender 11 and the receivers 21 to 28 can transceives data therebetween through the routers 107 to 109.

The X-cast process in accordance with the present invention operates in two different modes: a destination router registration mode and a multicast data packet transmission mode, which will be now described in detail.

The destination router registration mode, which is illustrated in FIG. 2 and FIG. 3, is a process for providing address information on the destination routers 103 and 105 and a multicast group including the receivers 21 to 28 to the source router 101.

The present invention uses a multicast group joining method, which is implemented by using IGMP (Internet Group Management Protocol), for providing addresses of the receivers 21 to 28 and the multicast group to the destination routers 103 and 105.

In the multicast group joining method of the prior art, the receivers 21 to 28 send an IP data packet having addresses thereof to the destination router 103 and 105, wherein an IP header of the IP data packet has an address of a multicast group including the receivers. In general, the IP data packet is called a multicast group join signal (refer to as a MGJ signal hereinafter). The destination routers 103 and 105, which receives the MGJ signal, reads addresses of the receivers 21 to 28 from the MGJ signal and stores the addresses into a table in its internal memory. Also, the destination routers 103 and 105 duplicate the MGJ signal and multicasts the duplicated MGJ signals to neighboring routers. The duplication and multicasting of the MGJ signal is performed by all of the routers in the network, such that all of the routers can recognize addresses of the receivers 21 to 28 and forward IP data packets to the receivers 21 to 28 by using the addresses.

Meanwhile, in the present invention, the receivers 21 to 28 send the MGJ signals to the destination routers 103 and 105. The destination routers 103 and 105, which receive the MGJ signals, stores information included in the signals, i.e., an address of a multicast group including the receivers 21 to 28, to a table located in its internal memory. Further, the destination routers 103 and 105 send destination router entry signals (refer to as DRE signals hereinafter), i.e., IP data packets including addresses of the multicast group G1 or G2 and the destination routers 103 and 105, to the source router 101 by using a unicast mode. In this case, the DRE signals are transmitted through a plurality of routers in the network.

The source router 101, which receives the DRE signals, extracts the addresses of the destination routers 103 and 105 and the multicast group G1 or G2, and store them into a table in its internal memory, as shown in FIG. 4.

After the destination router registration process mentioned above is completed, the source router 101 can transmit data to the receivers 21 to 28 included in the multicast group G1 or G2 by using an address of the multicast group G1 or G2.

In the following, referring to FIG. 5 and FIG. 6, a process of transmitting data in accordance with an X-cast mode of the present invention will be described in detail.

The sender 11 transmits an IP data packet (refer to as a first multicast packet) to the source router 101, wherein the first multicast packet includes an header and an payload; the header includes an address allocated to the multicast group G1 or G2, and the payload includes information which the sender 11 wants to send to the multicast group G1 or G2. In the prior art, when receiving the first multicast packet including the address of the multicast group G1 or G2, the source router 101 duplicates the packet to multicast it. However, in the present invention, the source router 101 deals with the first multicast packet as follows.

When receiving the first multicast packet, the source router 101 of the present invention searches a table, which is shown in FIG. 4, for deciding whether there is stored therein a multicast group address corresponding to the multicast group address included in the header of the first multicast packet. If no matching therebetween is found, the source router 101 duplicates the first multicast packet to multicast the duplicated multicast packets in the same way as the prior art. Otherwise, the source router 101 converts the first multicast packet into an X-cast IP data packet (refer to as an X-cast packet hereinafter) shown in FIG. 7.

As shown in FIG. 7, the X-cast packet includes an IP header, an X-cast header, a TCP header and a payload. The IP header includes an X-cast address representing a destination to which the X-cast packet will be transmitted.

As shown in FIG. 4, among the destination router addresses in the table, the source router 101 selects addresses of destination routers 103 and 105 corresponding to the address of the multicast group G1 or G2 included in the first multicast packet supplied from the sender 11, and stores them into the X-cast header of the X-cast packet.

Once the X-cast packet is produced, the source router 101 transmits the X-cast packet to an X-cast address of the IP header, i.e., the destination routers 103 and 105 via other routers 107 to 109 in the network. In this case, the router 109 directly coupled to the destination routers 103 and 105 duplicates the X-cast packet and sends the duplicated X-cast packets to the destination routers 103 and 106. Instead, the router 109 can convert the X-cast packet into a unicast IP data packet and send it to the destination routers 103 and 105.

And then, the destination routers 103 and 105 extracts the multicast group address included in the X-cast header of the X-cast packet and generates a multicast IP data packet (refer to as a second multicast packet) having the extracted multicast group address in its IP header. A payload of the second multicast packet is filled with the payload of the X-cast packet. Although the second multicast packet is transmitted to the receivers 21 to 28, only the receivers (for example, 21, 22, 23 and 24) belonging to the multicast group (for example, G1) can receive the second multicast packet.

As mentioned above, the source router 101 converts the first multicast packet into the X-cast packet. However, it is also possible that the sender 11 converts the first multicast packet into the X-cast packet.

While the invention has been shown and described with respect to the preferred embodiments, it will be understood by those skilled in the art that various chances and modifications may be made without departing from the spirit and scope of the invention.

The invention claimed is:

1. A method for transmitting data to a multicast group, including a plurality of receivers and one or more destination routers, by using an X-cast mode, the method comprising:

transmitting an X-cast IP data packet, having an X-cast header including addresses of each destination router including in the multicast group, to a destination router of the multicast group, wherein the destination router is connected to one or more of the receivers of the multicast group and stores an allocated address of the multicast group within an internal memory of the destination router, and the destination router is directly coupled to each destination router included in the multicast group; and converting the X-cast IP data packet into a second multicast IP data packet, having an IP header including the address of the multicast group, and transmitting the second multicast IP data packet to each receiver coupled to the destination router, wherein only the receivers of the multicast group can receive the second multicast IP data packet; and wherein a source router stores the addresses of the multicast group and the destination router corresponding to the multicast proud into a memory and converts a first multicast IP data racket into the X-cast IP data racket if an address of the multicast group included in an IP header of the first multicast IP data racket is equal to one of the addresses of the multicast groups stored in the memory.

2. The method of claim 1, wherein the source router connected to a sender receives the first multicast IP data packet having the IP header including the address of the multicast group from the sender and converts the first multicast IP data packet into the X-cast IP data packet.

3. The method of claim 1, wherein the X-cast IP data packet is generated by a sender connected to a source router.

4. A method for providing addresses of one or more destination routers and a multicast group, including a plurality of receivers and the one or more destination routers, to a source router, wherein the one or more destination routers are collectively connected to the receivers and the source router is connected to a sender, the method comprising the steps of:

transmitting a multicast IP data packet, having an IP header including an address of the multicast group, from the receivers to a destination router of the multicast group by using a multicast group joining method, wherein the destination router stores the address of the multicast group to a table located in an internal memory of the destination router, and the destination router is directly coupled to each destination router included in the multicast group;

transmitting an IP data packet, including the addresses of the multicast group and the destination routers of the multicast group, from each destination router to the source router as a destination router entry (DRE) signal using a unicast mode; and wherein a source router stores the addresses of the multicast group and the destination router corresponding to the multicast group into a memory and converts a first multicast IP data racket into an X-cast IP data racket if an address of the multicast group included in an IP header of the first multicast IP data racket is equal to one of the addresses of the multicast groups stored in the memory.

5. The method of claim 4, wherein the source router stores the addresses of the multicast group and the destination router into a memory by using the IP data packet.

* * * * *